US006603756B1

(12) United States Patent
Tappan

(10) Patent No.: US 6,603,756 B1
(45) Date of Patent: Aug. 5, 2003

(54) HIERARCHICAL LABEL SWITCHING ACROSS MULTIPLE OSPF AREAS

(75) Inventor: Daniel C. Tappan, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/269,330

(22) Filed: Oct. 11, 2002

Related U.S. Application Data

(63) Continuation of application No. 09/280,872, filed on Mar. 29, 1999, now Pat. No. 6,473,421.

(51) Int. Cl.⁷ .............................................. H04L 12/56
(52) U.S. Cl. ...................................... 370/351; 370/399
(58) Field of Search ................................. 370/351, 399, 370/238, 397; 709/230, 238, 241

(56) References Cited

U.S. PATENT DOCUMENTS

| | | | |
|---|---|---|---|
| 5,917,820 A | | 6/1999 | Rekhter |
| 5,991,300 A | | 11/1999 | Tappan |
| 6,041,057 A | * | 3/2000 | Stone .......................... 370/397 |
| 6,339,595 B1 | | 1/2001 | Rekhter et al. |
| 6,205,488 B1 | * | 3/2001 | Casey et al. ................ 709/238 |
| 6,331,978 B1 | * | 12/2001 | Ravikanth ................... 370/392 |
| 6,418,476 B1 | * | 7/2002 | Luciani ....................... 709/238 |
| 6,483,833 B1 | * | 11/2002 | Jagannath et al. .......... 370/392 |
| 6,499,061 B1 | * | 12/2002 | Benayoun et al. .......... 709/245 |
| 6,501,754 B1 | * | 12/2002 | Ohba et al. ................. 370/389 |

OTHER PUBLICATIONS

Jeremy Lawrence, "Designing Multiprotocol Label Switching Networks," IEEE Communications Magazine p134–142, 2001.*

P. Newman et al., "Ipsilon Flow Management Protocol Specification for Ipv4 Version 1.0," Internet Community's Request for Comments No. 1953, (May 1996).

M. Perez et al., "ATM Signaling Support for IP over ATM," Internet Community's Request for Comments No. 1755, (Feb. 1995).

J. Heinanen, "Multiprotocol Encapsulation over ATM Adaptation Layer 5," Internet Community's Request for Comments No. 1483, (Jul. 1993).

M. Laubach, "IP over ATM Working Group's Recommendations for the ATM Forum's Multiprotocol BOF Version 1," Internet Community's Request for Comments No. 1754, (Jan. 1995).

M. Laubach, "Classical IP and ARP over ATM," Internet Community's Request for Comments No. 1577, (Jan. 1994).

Martin de Prycker, *Asynchronous Transfer Mode Solution for Broadband ISDN*, Prentice Hall, 1995, pp. 5–11, 87–90.

D. Ginsburg, *ATM Solutions for Enterprise Internetworking*, Addison–Wesley Longman 1996, pp. xv–xiv, 36–41, 72–76.

R. Ullmann, "Rap: Internet Route Access Protocol," Internet Community's Request for Comments No. 1476, (Jun. 1993).

(List continued on next page.)

*Primary Examiner*—Ken Vanderpuye
(74) *Attorney, Agent, or Firm*—Cesari and McKenna, LLP

(57) ABSTRACT

A router has a first interface to receive a packet from an external autonomous system and a second interface to transmit the packet as an outgoing packet to a border router. A processing engine places a first tag on the outgoing packet in accordance with a standard tag switching protocol. A shared field in the outgoing packet has at least one bit to indicate a use of the shared field, the at least one bit set by the processing engine to indicate the shared field carries a second tag, the second tag indicating a route from the border router to a destination of the packet.

22 Claims, 7 Drawing Sheets

OTHER PUBLICATIONS

M. McGovern, et al., "CATNIP: Common Architecture For The Internet," Internet Community's Request for Comments No. 1707, (Oct. 1994).

S. Deering, et al., "Internet Protocol, Version 6, " Internet Community's Request for Comments No. 1883, (Dec. 1995).

Information Technology–Telecommunications And Information Exchange Between Systems –Protocol For Exchange Of Inter–Domain Routeing Information Among Intermediate Systems To Support Forwarding Of ISO 8473 PDU's, *International Standard ISO/IEC*, Oct. 1, 1994.

Ammendment 1, International Standard ISO/IEC, (Oct. 1, 1995).

G. P. Chandranmenon and G. Varghese, "Trading Packet Headers for Packet Processing," Proc.

Callon et al., A Framework for Multiprotocol Label Switching, IETF Network Working Group Internet Draft draft–ietf–mpls–framework–02.txt, Nov. 21, 1997.

Rosen et al., "A proposed Architecture for MPLS," IETF Network Working Group Internet Draft draft–ietf–mpls–arch–00.txt, Aug. 1997.

Woundy et al., "ARIS: Aggregate Route–Based IP Switching," Internet Draft draft–woundy–aris–ipswitching–00.txt, Nov. 1996.

Kalyaranaman et al., "Performance and Buffering Requirements of Internet Protocols over ATM ABR and UBR Services," *IEEE Communications Magazine*, vol. 36, No. 6, Jun. 1998.

K. Nagami et al., "Toshiba's Flow Attribute Notification Protocol (FANP) Specification," Internet Community's Request for Comments No. 2129, (Apr. 1997).

Y. Katsube et al., "Toshiba's Router Architecture Extensions for ATM: Overview," Internet Community's Request for Comments No. 2098, (Feb. 1997).

A. Viswanathan et al., "ARIS: Aggregate Route–Based IP Switching," Internet Draft, (Mar. 1997).

P. Newman et al., "Ipsilon's General Switch Management Protocol Specification Version 1.1," Internet Community's Request for Comments No. 1987, (Aug. 1996).

N. Feldman, "ARIS Specification," Internet Draft, (Mar. 1997).

"ISDN Data Link Layer Specification for Frame Mode Bearer Services," CCITT Recommendation Q.922, International Telecommunication Union, Geneva, 1992.

"Digital Subscriber Signalling System No. 1 (DDS 1) –Signalling Specification for Frame Mode Basic Call Control," ITU–T Recommendation Q.933, International Telecommunication Union, Geneva, 1994.

* cited by examiner

HIERARCHICAL LABEL SWITCHING ACROSS MULTIPLE OSPF AREAS

CROSS-REFERENCE TO RELATED APPLICATION

This application is a continuation of application Ser. No. 09/280,872, filed Mar. 29, 1999 now U.S. Pat. No. 6,473,421, entitled "Hierarchical Label Switching across Multiple OSPF Areas." The entirety of said copending application is hereby incorporated herein by reference.

BACKGROUND OF THE INVENTION

The present invention is directed to communications networking and in particular to networks that employ label switching.

Internetwork communications are based on operations of routers, which are network devices that determine, on the basis of destination information in packets that they receive, where to forward the packets so that they are likely to reach the intended destinations.

Router configurations vary widely, but FIG. 1 depicts a typical approach. Router 10 includes a plurality of communications interfaces 12, 14, and 16, which send and receive communications packets to and from remote locations. When one of the interface modules receives an incoming packet, it places header information from that packet onto an internal communications bus 18 by which it communicates with a forwarding engine 20, typically a high-performance processor configured by instructions in associated storage circuitry, that determines where the packet should be sent. Once the decision has been made, an output packet is formed from the input packet by packet assembly circuitry that may reside in one or more of the interface modules and the forwarding engine, and the forwarding engine operates another interface to cause it to send the output packet to a further remote location.

FIG. 2 depicts the router 10 in a local-network environment in which it communicates through one of its interfaces to such remote locations by way of a local-area-network bus 22. In a link of that nature, there are typically a number of network devices, such as network devices 24, 26, 28, and 30, that receive the resultant packet-bearing signals, but the packet is not usually intended for all of them. Different systems employ different packet formats to enable their various network devices to distinguish the packets they should read from the ones they should not, but the Ethernet packet format of FIG. 3 is typical.

In that drawing, each packet begins with a link-layer header 32. The link-layer header includes, among other fields, a field that contains a link-layer destination address. If the destination address does not match the address of a network-device interface that receives the packet, that network device ignores the packet.

For present purposes, we will assume that router 10 intends the packet to be received by a further router 30, so the link-layer header's destination-address field will contain the link-layer address of router 30's interface with network link 22. That interface accordingly reads the remainder of the packet,,verifying that the contents of a cyclic-redundancy-code trailer 34 are consistent with the remainder of the packet. It then proceeds to process the link-layer packet's payload 36 in accordance with a protocol that the link-layer header's type field specifies.

In the present case, the type field specifies that the link-layer packet's payload is an Internet Protocol ("IP") datagram, which is a network-layer protocol data unit. The purpose of the router's IP process is to determine how to forward the datagram to its ultimate (internetwork-host) destination. To make this determination, the IP process inspects the IP datagram's header 38, and in particular its IP destination-address field. That field's contents identify the host system to which the datagram's contents are to be directed, and router 30 uses this address to determine through which of its interfaces to forward the packet on to that host system.

The router makes this determination by using a forwarding table, into which it has distilled information about internetwork topology that it has typically obtained by communications with other routers. Routers inform other routers of the host systems to which they can forward communications packets, and they employ such information obtained from other routers to populate their forwarding tables.

Now, the IP address is 32 bits long in most versions and even longer in versions that will soon be adopted, so the IP address could theoretically distinguish among over four billion host systems. Actually, the number of host systems that have globally unique IP addresses is much smaller that this, but the number still is much greater than it is practical for an individual router to have route entries for in its forwarding table.

The solution to this problem historically has been to base the table look-up on destination-address prefixes. That is, some routers will simply indicate that they can handle traffic to all hosts whose destination addresses begin with a particular, say, 16-bit sequence, or "prefix." Additionally, a router may compact its information so as to store routes in this form. Prefixes vary in length, the longest being the most specific and thus presumably representing the best routes to the included host addresses. So when a router receives an IP datagram, it searches through the prefix entries in the forwarding table to find the longest-prefix that matches the incoming packet's destination address. When it finds that route in its forwarding table, it reads that route's fields that specify the interface over which it should forward the packet and the link-layer address of the router to which the interface should send the packet for further forwarding.

Although this approach has proved quite serviceable and robust, it has exhibited shortcomings that have led some workers to propose a table-index-based forwarding approach for high-speed networks such as those of some Internet-service providers ("ISPs"). Specifically, routers would inform their neighbor routers of the locations within their tables at which the routes to particular prefixes are located. When their neighbors send them packets destined for those prefixes, those neighbors insert a "shim" between the link-layer header (such as an Ethernet header) and the network-layer header (typically, an IP header). This shim's contents include a label (also referred to as a "tag") that is an index to the desired route in the receiving router's forwarding table.

One of this approach's advantages is that it relieves the receiving router of the need to perform an expensive longest-match search: the label points the receiving router directly to the correct forwarding-table entry. Commonly assigned co-pending U.S. patent application Ser. No. 08/997,343, filed on Dec. 23, 1997 now U.S. Pat. No. 6,339,545, by Rekhter et al. for Peer Model Support for Virtual Private Networks with Potentially Overlapping Addresses, describes in detail one proposal, known as Multiple-Protocol Label Switching ("MPLS"), for employing such shims. That application also includes an exemplary protocol, referred to as the Tag Distribution Protocol ("TDP") by which routers inform their neighbors of the labels that they associate with their forwarding-table entries. I hereby incorporate that application in its entirety by reference.

FIG. 4 depicts the resultant packet format. The link-layer header has the same format as in FIG. 3, but its type field identifies the link-layer payload as beginning not with an IP header but rather with an MPLS header, or "shim" between the link-layer header and the network-layer header. FIG. 4 illustrates the MPLS header's format. The MPLS header is organized as a stack of entries, and FIG. 4 gives an example in which there are two entries 40 and 42. In addition to other information, each entry includes a label, which is an index into the forwarding table of the label-switching router that receives it. When a router receives such a packet, it consults the forwarding-table entry that the label specifies and replaces that label with a replacement label that the specified forwarding-table entry contains. That replacement label is typically one that the next router on the path to the requested destination has asked to be included in packets sent to it and intended for the destination with which the forwarding table is associated. For reasons that will become apparent below, the MPLS header may contain more than one label, and the end-of-stack ("S") bit in a stack entry indicates whether it is the bottom entry in the stack. That bit is not set in FIG. 4's entry 40, so that the stack entry is not the bottom one, but it is set in entry 42, which therefore is the bottom stack entry.

Although the formats described in FIGS. 3 and 4 are typical formats for packets exchanged between label-switching routers, they are not the only formats that such routers employ. Routers that communicate with each other over a point-to-point link, i.e., not by way of a shared medium, typically would employ a link-level protocol different from the Ethernet protocol just described, and the formats employed on some "Ethernet" links are actually somewhat more complicated than the format depicted here. In addition, packet forwarding often occurs by way of Asynchronous Transfer Mode ("ATM") links.

In the case of label-switching routers implemented in ATM switches, the IP datagrams are encapsulated in ATM frames. FIG. 5's third row depicts an ATM frame, and its fourth and fifth rows show that the frame's payload is similar to the IP datagram and shim header that FIG. 4's Ethernet header and trailer encapsulate. The only difference is that FIG. 5's fifth row represents the top label by question marks, which indicate that the top label's contents do not matter.

The reason why they do not is that the routing decisions based on those contents when the label-switching router is implemented as a conventional IP router are instead based on an ATM VPI/VCI field in the header of an ATM "cell" when the label-switching router is implemented as an ATM switch. From the point of view of an ATM client, the frame of FIG. 5's third row is the basic unit of transmission, and it can vary in length to as much as 64 Kbytes of payload. (Those skilled in the art will recognize that there are also other possible ATM frame formats, but FIG. 5's third row depicts one, known as "AAL5," that would typically be employed for user data.) From the ATM switch's point of view, though, the basic transmission units are fixed-size cells into which the frames are divided.

Each cell consists of a header and a payload, as FIG. 5's second row illustrates. Among the purposes of the header's PTI field, depicted in FIG. 5's first row, is to indicate whether the cell is the last one in a frame. If it is, its last eight bytes form the frame trailer field that FIG. 5's third row depicts. Among other things, the trailer indicates how much of the preceding cell contents are actual payload, as opposed to padding used to complete a fixed-size cell.

The header field of interest to the present discussion is the VPI/VCI field of FIG. 5's first row. As is well known to those skilled in the art, ATM systems organize their routes into "virtual channels," which may from time to time be grouped into "virtual paths." Each switch associates a local virtual path/virtual channel indicator (VPI/VCI) with a channel or path that runs through it. When an ATM switch receives a cell, it consults the cell's VPI/VCI field to identify by table lookup the interface through which to forward the cell. It also replaces that field's contents with a value indicated by the table as being the next switch's code for that path or channel, and it sends the resultant cell to the next switch. In other words, the function performed by the VPI/VCI field enables it to serve as the stack's top label. This is why a label-switching router implemented as an ATM switch can ignore the top label field, on which other implementations rely.

It is desirable to use ATM switches in high-volume, "backbone" routers: their fixed cell sizes and use of virtual-channel indicators make it possible for them to operate very rapidly, as is desirable in high-bandwidth backbone networks. Because of the hardware ordinarily employed to implement them, though, ATM switches are subject to one particular drawback, and that is the size of the potential VCI space: the number of VCIs that a given ATM switch can have committed at any one time is relatively small. When a first ATM switch is to forward to a second ATM switch a packet intended for a new destination, the first switch asks the second switch to allocate a VCI for use by that first switch in sending the second switch any packets intended for that destination. Consequently, if the switch is interconnected with many other switches, all of which need its services to forward packets to many different destinations, the switch may be called on to allocate a number of VCIs that exceeds its capacity. Even in systems that do not employ ATM switches to implement label-switching routers, the memory capacity required for a large number of forwarding-information-base entries can be costly.

Proposals have been made to limit forwarding-table size by employing multi-level labeling. This is a type of tunneling, in which the packet being forwarded includes one or more labels representing intermediate destinations, typically in addition to a "bottom" label representing the ultimate destination. To forward such packets, switches along the route to the intermediate destination need not have allocated labels to the ultimate destination. The Rekhter et al. application described above sets forth an example by which, say, a service provider's edge router—i.e., a router with a link to one of the service provider's customers—attaches a top label requesting the route to another edge router as well as a bottom label representing the destination in the customer's network.

SUMMARY OF THE INVENTION

I have recognized that a further reduction in required label space can be achieved by taking advantage of the area concept employed by Open Shortest Path First ("OSPF"), a protocol popularly employed by routers within an autonomous system to exchange the topological information on which they base their routing decisions. Routers in a commonly administered group of networks conventionally employ OSPF to maintain a consistent view of the topology within that group of routers, which we will refer to as a "routing domain." Although the general intention of OSPF is for all of its routers to maintain a common map of the networks within the routing domain, routers in many existing OSPF domains are sometimes configured to divide the domain into "areas" between which there are topological-information differences. Specifically certain routers have links to more than one area and are configured to consider themselves "area border routers." Such routers export only a summary of one area's detailed topological information into another area, and this reduces the amount of topological information the various areas must maintain in order to perform their routing functions adequately.

I have recognized that a further reduction in required label space can be achieved by taking advantage of the area concept employed by Open Shortest Path First ("OSPF"), a protocol popularly employed by routers within an autonomous system to exchange the topological information on which they base their routing decisions. Routers in a commonly administered group of networks conventionally employ OSPF to maintain a consistent view of the topology within that group of routers, which we will refer to as a "routing domain." Although the general intention of OSPF is for all of its routers to maintain a common map of the networks within the routing domain, routers in many existing OSPF domains are sometimes configured to divide the domain into "areas" between which there are topological-information differences. Specifically, certain routers have links to more than one area and are configured to consider themselves "area border routers." Such routers export only a summary of one area's detailed topological information into another area, and this reduces the amount of topological information the various areas must maintain in order to perform their routing functions adequately.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
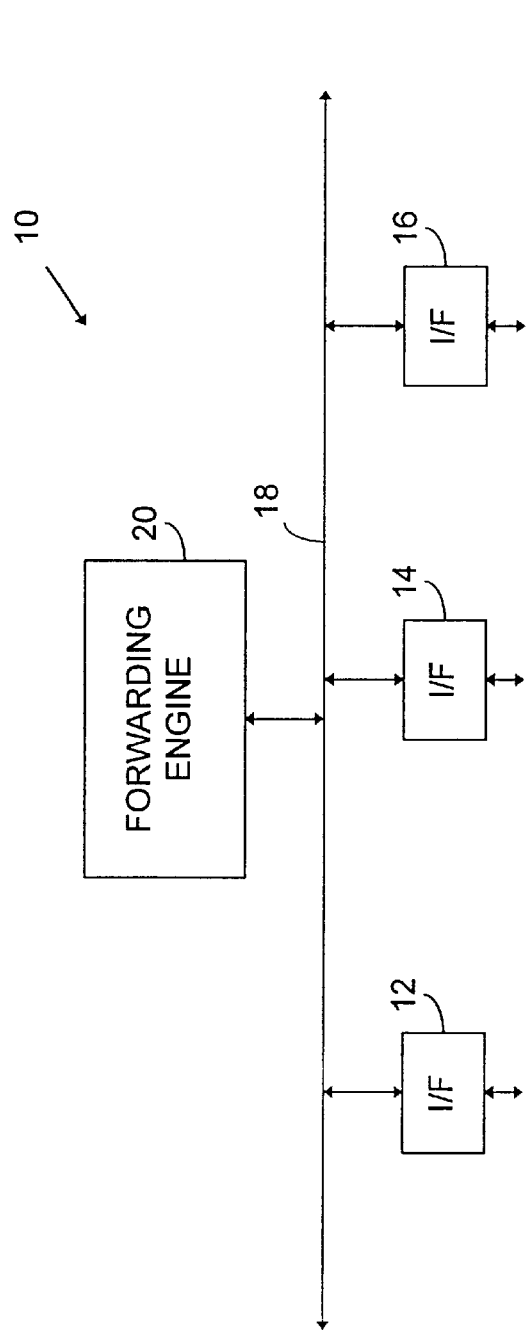
FIG. 1, described above, is a block diagram of a router.
Figure 2:
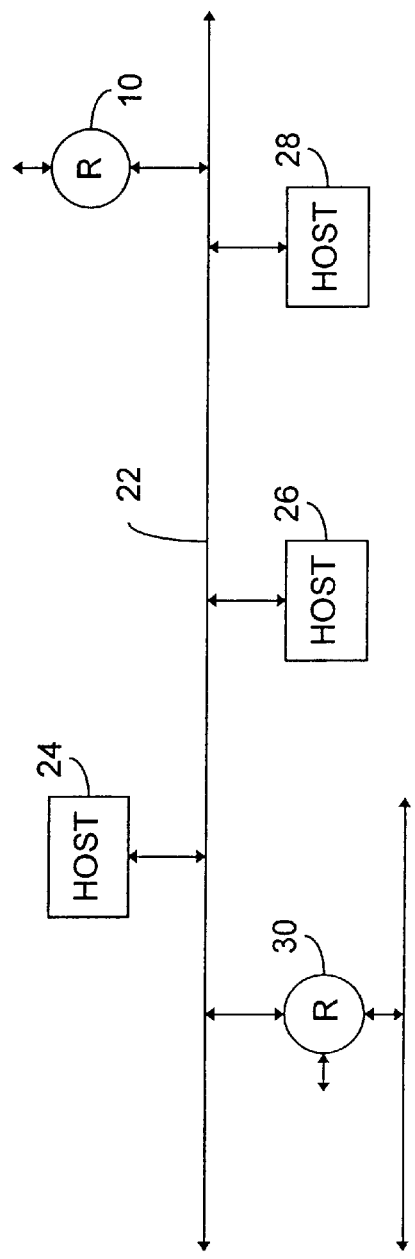
FIG. 2, described above, is a block diagram of a local-area network to which the router may be attached.
Figure 3:
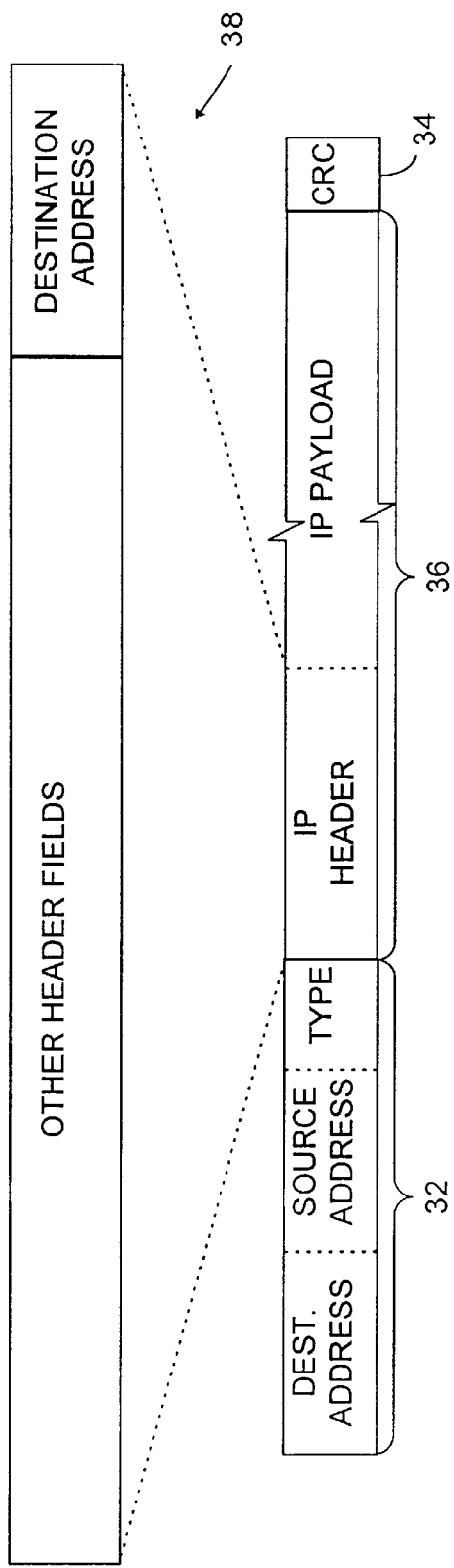
FIG. 3, described above, is a format diagram of an Ethernet frame containing an IP datagram as a payload.
Figure 4:
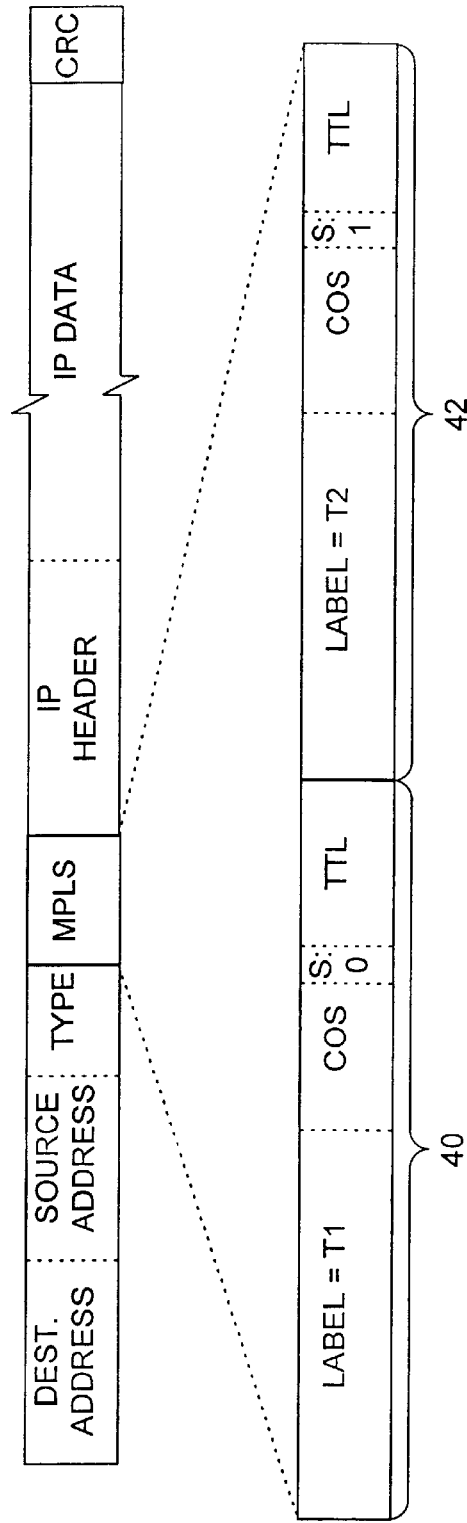
FIG. 4, described above, is a format diagram of an Ethernet frame in which an MPLS "shim" is disposed between the Ethernet header and the IP header.
Figure 5:
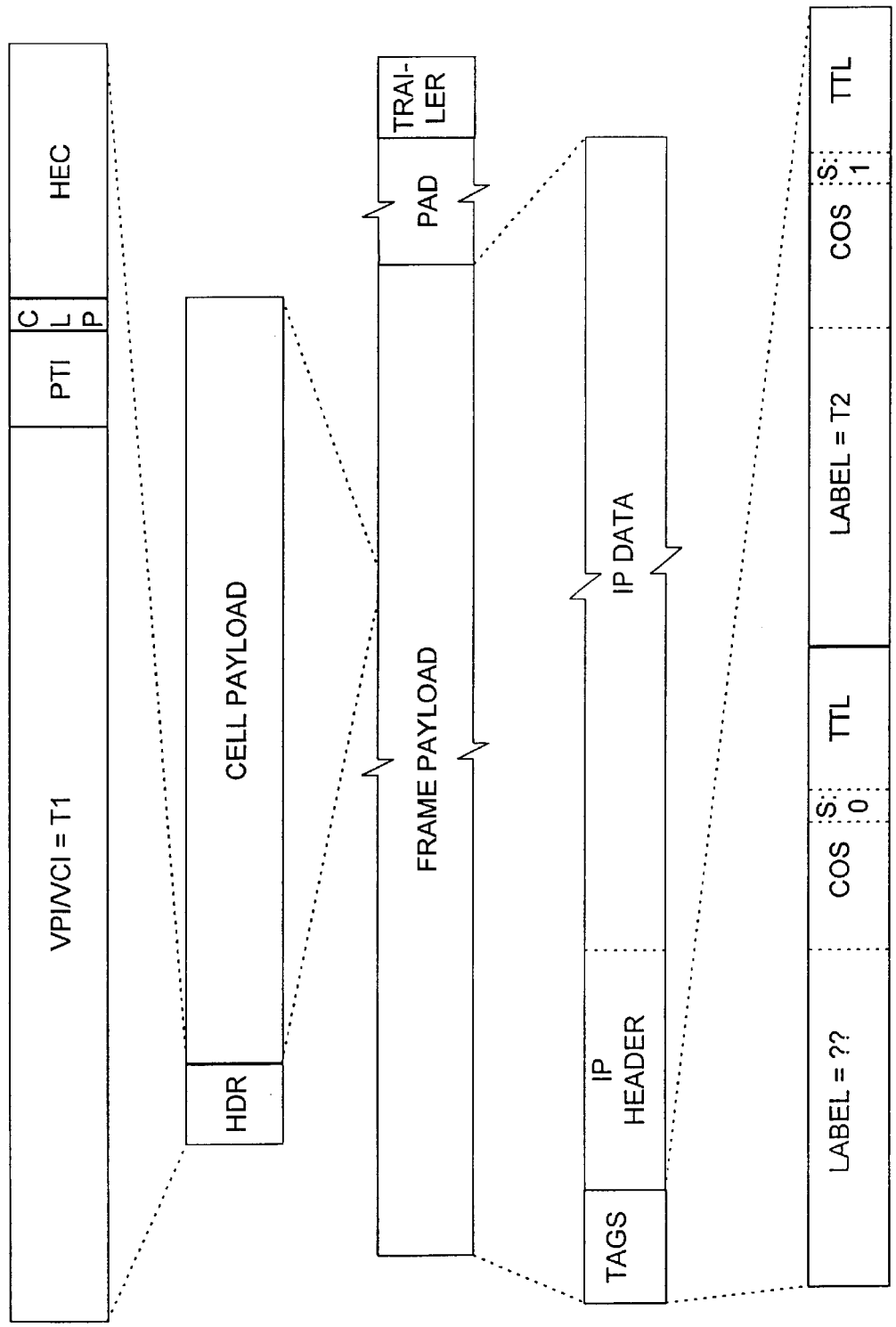
FIG. 5, described above, is a format diagram of an ATM frame containing an MPLS header and IP datagram.
Figure 6:
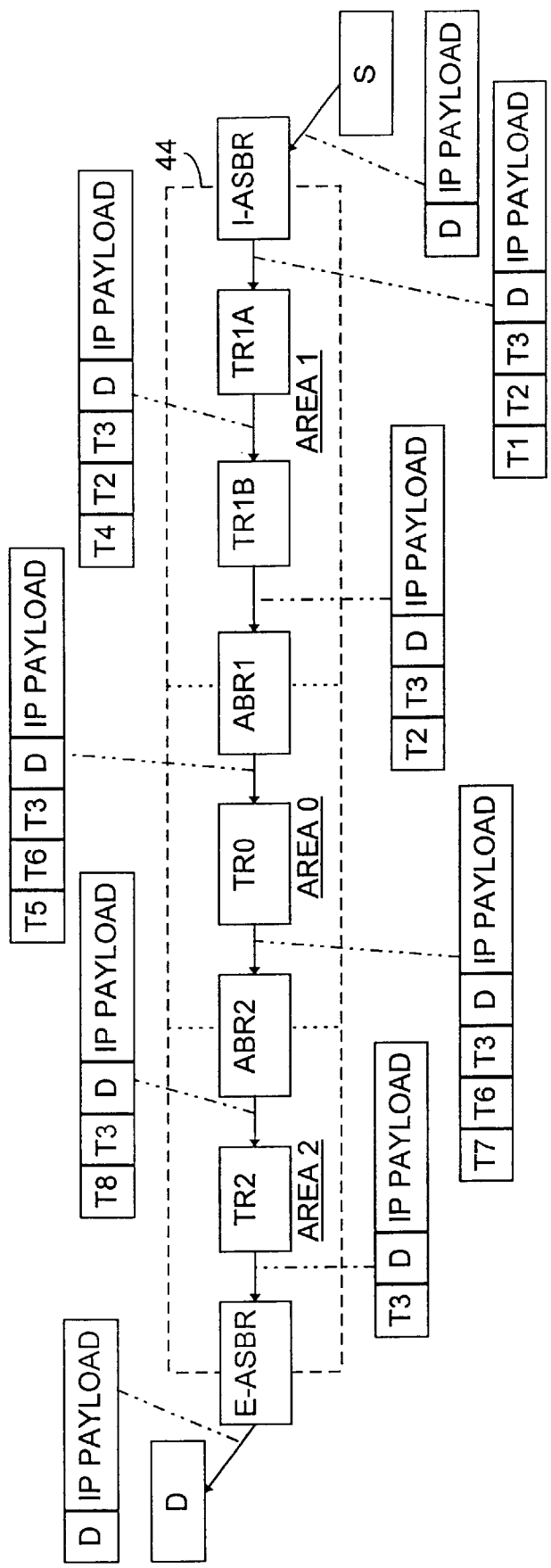
FIG. 6 is a diagram illustrating packet forwarding in accordance with the present invention's teachings.

To understand how the present invention reduces routers' required topological-informational storage, consider the data-packet-forwarding scenario that FIG. 6 illustrates. FIG. 6 depicts transmission of a packet from a source router S to a destination node D. The forwarding path passes through a routing domain 44 to which neither S nor D belongs. That is; routers within routing domain 44 maintain a consistent view of that domain's internal topology by exchanging OSPF messages with each other, but they send no OSPF messages outside the domain. This may be because the domain 44 is the property of, say, an ISP, whereas nodes S and D are owned by that ISP's customers. (As those skilled in the art will recognize, routers within domain 44 will typically use, say, the Border Gateway Protocol ("BGP") to send router S some type of routing information. But the information it thereby receives about the domain's internal topology depends on that domain's policy and is normally extremely limited.)

When router S needs to send a packet to router D, it generates an IP packet that FIG. 6 represents in abbreviated form as including its IP payload and the destination IP address D. The first of domain 44's routers to receive the packet will be referred to as "I-ASBR," for Ingress Autonomous System Border Router. In the terminology of exterior routing protocols, i.e., those such as BGP that are used to exchange information between domains that are not commonly administered, a domain such as domain 44 is referred to as an "autonomous system," and I-ASBR is an autonomous-system border router because it communicates with nodes outside the autonomous system.

As FIG. 6 indicates, I-ASBR receives a normal IP packet from external router S; the drawing represents that packet by its IP payload and the "D" value in its IP header's destination-address field. Receiving such a non-labeled packet, I-ASBR searches its forwarding table for the entry having the longest-prefix match. Let us say that the longest-matching prefix is prefix P. Now, there are a number of ways in which I-ASBR could have obtained information placed in that entry about how to route a packet to P-prefixed destinations. For the sake of example, we will assume that I-ASBR has received this information in a BGP message sent to it by another autonomous-system border router, E-ASBR. As stated above, BGP is an exterior routing protocol: autonomous-system border routers use it to communicate forwarding information to other autonomous-system border routers. Additionally, border routers in a common autonomous system use that protocol to exchange among themselves topological information concerning exterior routes so that they can provide a consistent appearance to exterior routers. One such BGP message would have been a message from E-ASBR to I-ASBR telling I-ASBR that E-ASBR can forward packets to exterior P-prefixed destinations (including D) and that packets sent through E-ASBR should be labeled with label T3 so as to enable E-ASBR to locate its entry for those destinations in a rapid manner. The Rekhter et al. application mentioned above describes a way of using BGP for this purpose.

In creating its forwarding-table entry for destination D's network P, though, I-ASBR additionally entered other labels in the label stack to be placed on packets forwarded in accordance with that entry. As is conventional, it would typically have included as the label stack's top label a label that its immediate downstream neighbor, TR1A, has requested to be used for certain packets sent to it.

In accordance with the present invention, though, that top label specifies TR1A's forwarding-table location of the entry, not for forwarding to the egress autonomous-system border router E-ASBR, but rather for forwarding to router ABR1, which is a border router in I-ASBR's OSPF area, Area-1. Also in accordance with the present invention, an OSPF message to I-ASBR contained the information that it needed to set up its forwarding-table entry in this manner. As will now be explained, that OSPF message was ultimately caused by one that E-ASBR sent to its upstream neighbor TR2.

Figure 7:
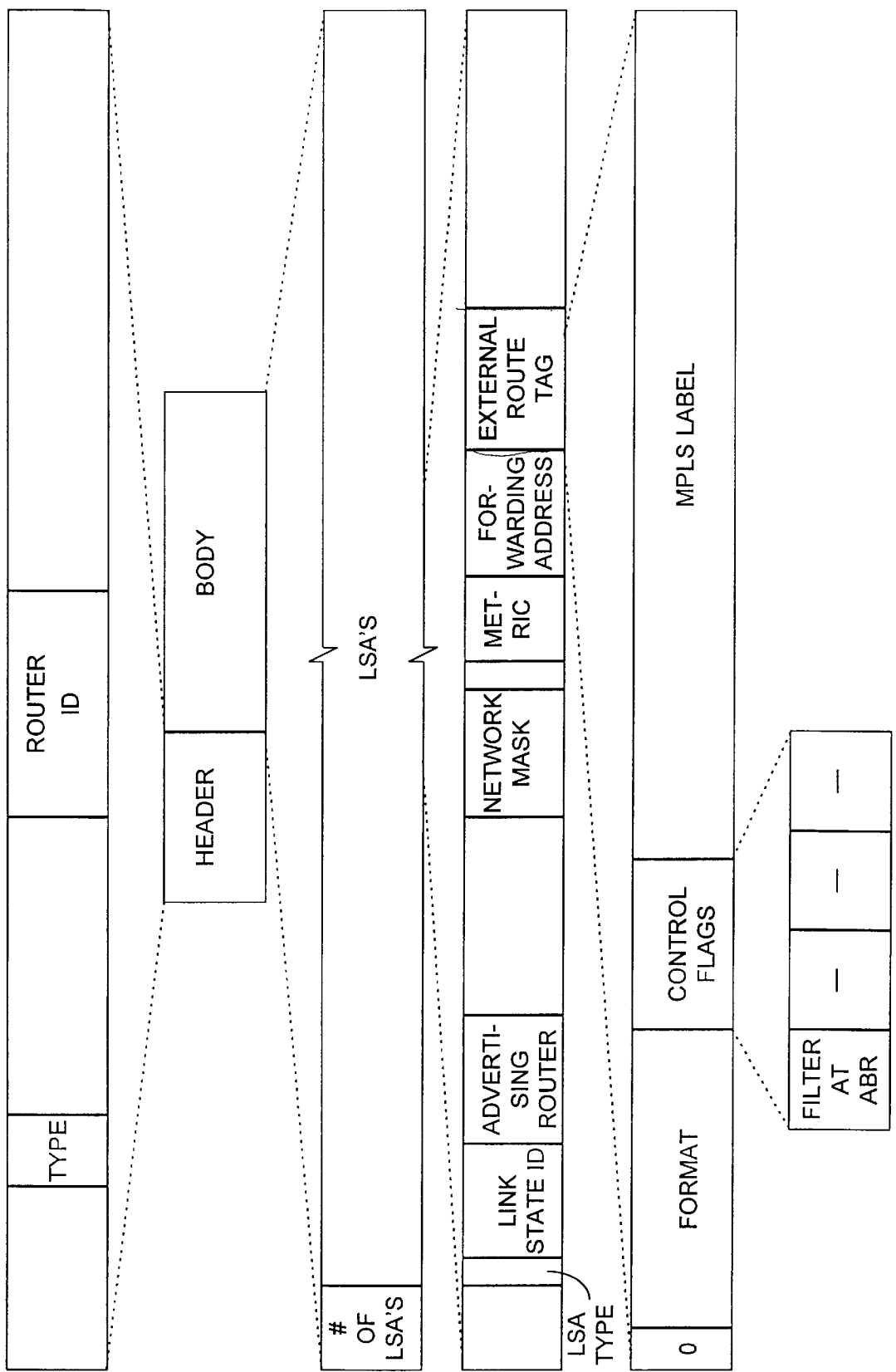
FIG. 7 is a format diagram of an OSPF LSA-Update message employed in accordance with the present invention's teachings.

FIG. 7 depicts the OSPF message format that was used for this purpose. That drawing's second row depicts the conventional header/body organization of an OSPF message. Such a message is the payload of an IP datagram: the IP datagram's protocol field contains the code that identifies the payload as an OSPF message. The drawing's top row depicts selected header fields. Of these, the type field indicates which of the several standard OSPF-message formats the message assumes. In this case, the type is "LSA Update," whose purpose is to transmit one or more link-state advertisements ("LSAs") from one router to a (typically) neighbor router. An LSA is the unit of topological information that routers exchange under OSPF. The router that is sending the LSA update is specified in the header's router ID field.

When the OSPF message is of the LSA Update type, the message's body assumes the format that FIG. 7's third row depicts. The body's first field indicates how many LSAs the update message contains, and the remainder of the body contains those LSAs. Different LSAs have different formats, the particular format assumed by an LSA being indicated by its LSA-type field depicted in FIG. 7's fourth row. The particular LSA format of interest here is identified in the Internet community's Request for Comments No. 2178 ("RFC 2178") as an "AS-External LSA." This is the type of LSA that a router ordinarily employs to transmit information regarding external destinations, i.e., destinations outside the OSPF domain. In accordance with the present invention, though, that type of LSA is employed to install hierarchical labels along routes to E-ASBR, as will now be explained.

E-ASBR sends other routers in its area, including router TR2, an LSA of the type just described. The Link State ID field of FIG. 7's fourth row; which is used in an LSA to specify the router or other topological item about which the LSA reports, contains an address of E-ASBR, while the Network Mask field contains all ones to indicate that the Link State ID field contains a complete IP address rather than an IP address prefix.

The LSA's Advertising Router field-identifies the router that initiated the LSA, in this case E-ASBR. (As will be seen, routers that receive the message containing the LSA store some of its contents and then relay the information to other routers. In doing so, they preserve the contents of the Advertising Router field but substitute their own IDs in the Router ID field.) An AS-External LSA is conventionally an indication that the advertising router has become aware of an external destination. To indicate that the advertising router can relay data packets to that external destination, it places the address 0.0.0.0 in the Forwarding Address field; otherwise, that field receives the address of another router, through which access to the external location can be had. Although E-ASBR is here using the AS-External LSA for a purpose other than to report an external destination's location, it still places the default route 0.0.0.0 in its Forwarding Address field, for a reason that will manifest itself presently.

From the point of view of E-ASBR, the purpose of this LSA is to tell upstream (in the FIG. 6 sense) neighbor routers that, as will be illustrated below, they should "pop" the label stack of a packet whose top label represents the upstream neighbor's forwarding-table entry for E-ASBR. To signal its intention that the LSA be interpreted as conveying such label information, E-ASBR does two things. First, it places a zero in the first bit of the LSA's External Route Tag field. When that bit is set, existing OSPF speakers interpret the remainder of that field in accordance with RFC 1403, which describes a way to input into the OSPF domain a route that an autonomous-system border router has learned by way of BGP. By keeping this bit zero, E-ASBR is preventing routers from interpreting the field in that manner. Second, it places an MPLS label in the External Route Tag field. The particular format by which this invention's teachings are implemented to accomplish this is not critical, but FIG. 7's fifth and sixth rows depict a format that can be employed for this purpose. As a practical matter, there should also be some bits allocated to specifying that the format is indeed of the MPLS-label-carrying variety; this permits other interpretations also to be given to this field when its first bit is zero. In the illustrated example, the Format field, which may be, say, seven bits in length, serves this purpose. That is, it contains a predetermined label-container-indicating value, which indicates that the remainder of the external Route Tag field is of the MPLS-label-carrying type. This means that it includes an MPLS-label field, as FIG. 7's fifth row illustrates. That field, which may be, say, twenty bits in length, contains the label whose advertisement is this particular LSA's purpose.

In the case of the LSA generated by E-ASBR, that field contains the value that in MPLS terminology is referred to as an explicit NULL. In MPLS labeling a NULL label can be interpreted to mean either to remove the top label or not to add additional labels when labeled packets are forwarded to the destination indicated. So the effect of that LSA from E-ASBR is that TR2 and ABR2 should not add an additional label based on that LSA.

In a sense this LSA is usually superfluous, because, as will be explained below, Area 2 routers will not ordinarily refer to it in generating their forwarding tables. But placing it in an OSPF LSA Update message triggers the OSPF flooding behavior that we now consider.

When transit router TR2 receives this AS-External LSA, it stores it for possible use in constructing or updating its forwarding table, and, in accordance with normal OSPF flooding practice, it sends a corresponding LSA in an LSA Update message to ABR2. As FIG. 8 indicates, the LSA that it sends to ABR2 is essentially the same as the one it received from E-ASBR.

In accordance with the present invention, the way in which ABR2 deals with this LSA differs from the way in which TR2 does, because ABR2 is configured as an area border router.

When an OSPF-speaking router receives an LSA from a neighbor router, it determines whether it already has an equally or more current version of that LSA. (OSPF provides sequence numbers by which OSPF speakers can determine which version is later.) If not, the router installs that LSA in a topological-information base from which it calculates its forwarding table. If the router is an area border router of the type that the illustrated embodiment employs, it additionally originates a filtered version of that LSA, as will be described presently. Moreover, the ABR also participates in a "flooding" procedure by sending the received or newly originated LSA to other neighbor routers.

Figure 8:
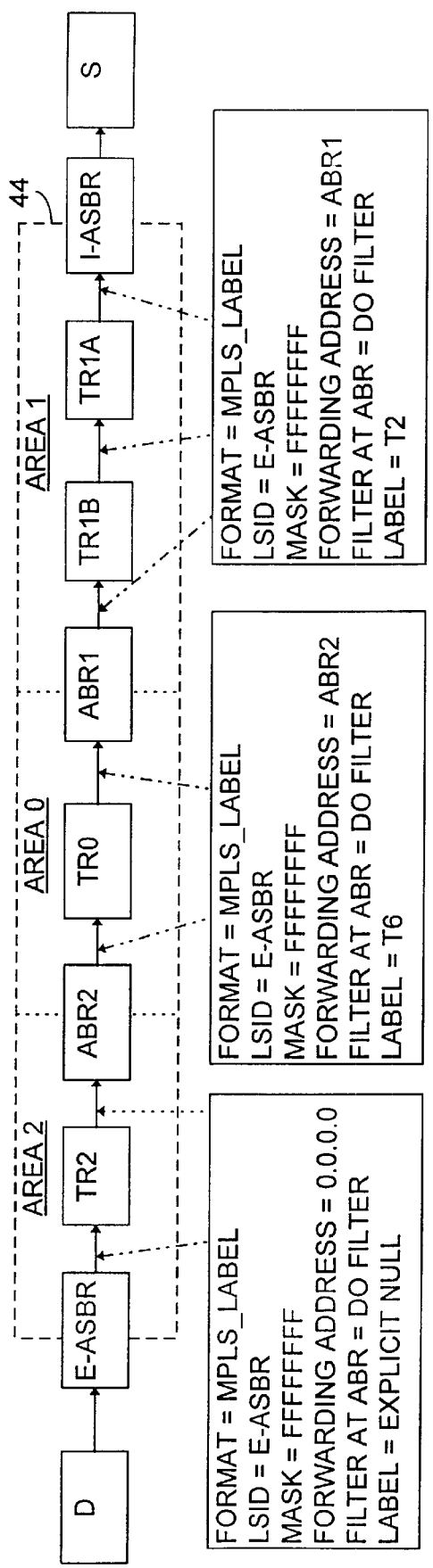
FIG. 8 is a diagram illustrating LSA propagation in accordance with the present invention's teachings.
Figure 9:
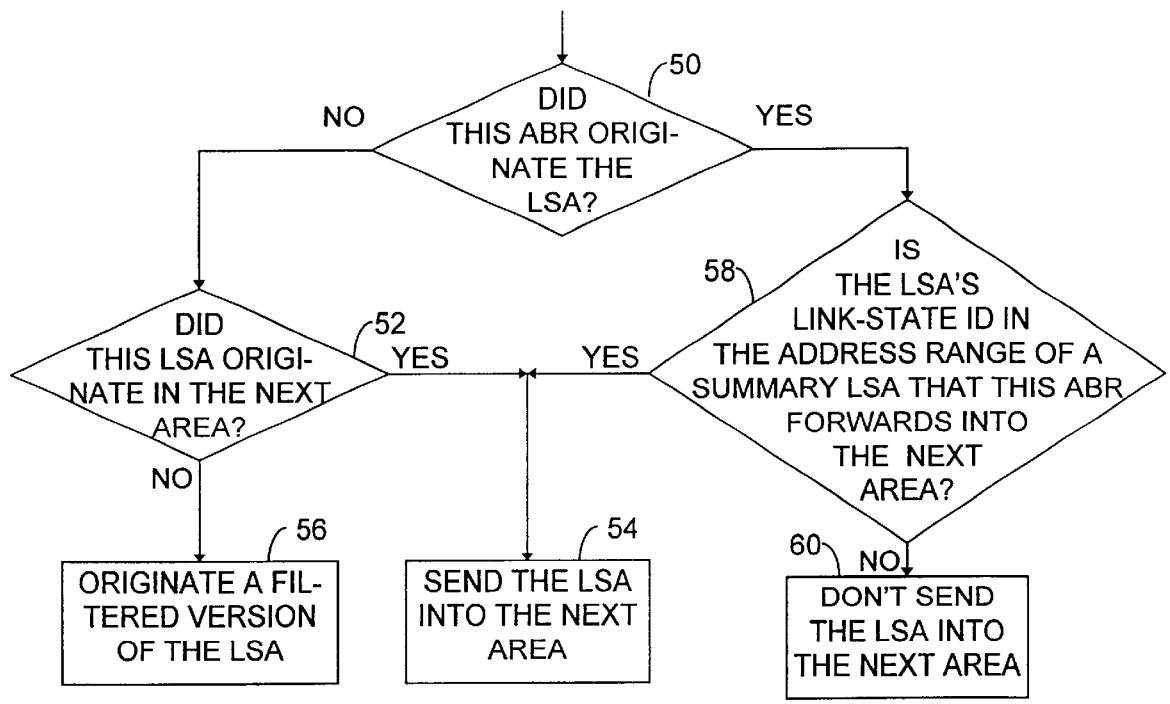
FIG. 9 is a flow chart that illustrates part of the LSA-forwarding-decision process that an area border router performs in accordance with the present invention's teachings.

When, as is the case in the scenario that FIG. 8 illustrates, the received or newly generated LSA is an AS-External LSA in which the External Route Tag field's first bit is zero and its Format part identifies it as containing an MPLS label, an area border router such as ABR2 that implements the present invention's teachings executes the FIG. 9 routine to determine whether to send the LSA to a given neighbor router as part of the flooding procedure. In the case of the LSA that ABR2 receives from TR2, the result of the decision represented by block 50 is negative: it was E-ASBR, not ABR2, that originated that LSA. So the routine proceeds to that drawing's block 52, which represents determining whether the LSA originated in the area into which ABR2 is deciding whether to send it. Although FIG. 8 shows no ABR2 neighbor in Area 2 other than TR2, from which ABR2 received that LSA, there could be others, and ABR2 would send the received LSA to them, as block 54 indicates.

When ABR2 is determining whether to send the received LSA to TR0 in Area 0, though, the result of block 52's decision is negative. For that situation, the FIG. 9 chart is based on an assumption concerning the Control Flags field that FIG. 7's sixth row depicts. The illustrated embodiment allocates four bits of the External Route Tag this field to control flags. This is somewhat arbitrary, since three of them are left for further enhancements. That is, those bits are ignored in the absence of such enhancements. In accordance with convention, their value should be zero in messages from a router in which such enhancements are not implemented.

In the illustrated embodiment, though, the first of the control flags is a Filter at ABR flag, and in the illustrated scenario that flag is set. Routers, such as TR2, that are not area border routers ignore that flag. But when an area border router implementing the illustrated embodiment of the present invention's teachings receives an AS-External LSA in which the first bit and Format part of the External Route Tag field indicate that the LSA is of the MPLS-label-containing variety, it consults that flag.

The above-mentioned assumption on which FIG. 9 is based is that the Filter at ABR flag is set. When it is, an area border router receiving the LSA interprets it as an instruction not to send, as TR2 did, an essentially identical LSA, i.e., an LSA advertising E-ASBR's requested label for E-ASBR-destined packets. Instead, it advertises a label to be used on packets sent to ABR2 for forwarding to E-ASBR. More generally, an ABR should place in the LSA's MPLS Label field a label that routers should use in forwarding packets by way of the router identified by the LSA's Forwarding Address field to the destination that the LSA's Link State ID represents.

So ABR2 generates the LSA by copying the Link State ID, Network Mask, and Format fields and the Filter at ABR flag from the received LSA, setting the Forwarding Address field to ABR2's address, and placing in the MPLS Label field a label value, say, T6, that identifies the location of ABR2's forwarding-table entry that tells where to forward packets destined for E-ASBR. ABR2 must then decide into which areas to flood the thus-generated LSA. (Since it is originating a new LSA, it also puts its own ID in the Advertising Router field.)

For this filtered LSA, ABR2 is indeed the originator, so the result of the block-50 test is positive. ABR2 therefore makes the decision that block 58 represents. In the case of ABR2, the purpose of that decision is to prevent ABR2 from flooding a translated LSA back into Area 2. ABR2 may receive the MPLS LSAs from any of the areas to which it is connected. It will end up basing the replicant on the "closest" one, but there is no guarantee of the order in which the LSAs will be received.

In particular, if some other ABR (not shown) is also connected to both Area 2 and Area 0, then ABR2 may receive from Area 0 an AS-External LSA for E-ASBR originated by that other router, and that LSA may arrive before the one originated by E-ASBR. In that situation. ABR2 will generate a translation. Flooding that translated LSA into Area 2 would waste OSPF control bandwidth.

To appreciate the way in which the illustrated embodiment avoids this result, recall that routers configured as OSPF area border routers send into one area only summaries of the topological information that describes an adjacent area. More specifically, they send LSAs of a type, known as a Summary LSA, that reports to one area the presence within another area of an address range without specifying the other area's particular addresses within that range. The block-58 test determines whether the LSA's link-state ID (which identifies E-ASBR in this case) specifies a router that has an address in a range for which the ABR sends Summary LSAs into the proposed neighbor area. In the case of an E-ASBR-specifying LSA received from Area 0 for which ABR2 is determining whether to flood it into Area 2, the answer would be no, so the flooding and attendant bandwidth waste would not occur.

But the answer is yes in the particular case that FIG. 8 illustrates; E-ASBR, being in Area 2, would have an interface address within a range that ABR2 is configured to report into Area 0. ABR2 therefore sends the newly originated AS-External LSA into Area 0. When TR0 receives this LSA, it stores it and sends its neighbor ABR1 an LSA that is essentially identical, just as transit router TR2 did; it does not filter the LSA, as ABR2 did, because TR0 is not an area border router.

On the other hand, ABR1 is an area border router, so it generates a new AS-External LSA, which requests use of a label that specifies an entry in ABR1's forwarding table. Let us refer to as T2 the label whose use it thereby requests. As FIG. 8 indicates, routers TR1B and TR1A receive and send essentially identical LSAs. I-ABR receives the one sent by TR1A. I-ASBR may send LSAs to further routers in that domain in response, but the example topology includes no such other neighbors within the OSPF domain. (Router S is not in OSPF domain 44, so it does not receive OSPF messages from that domain.)

We now return to consideration of what I-ASBR does in response to a data packet from the external source router S. As was mentioned above, I-ASBR performs a longest-match search for the address, D, in the incoming IP packet's destination-address field. As was also mentioned above, it thereby finds an entry installed as a result of an internal BGP message from E-ASBR saying that E-ASBR can afford access to prefix P, which is I-ASBR's longest match for destination D. The BGP message also directs it to label such packets with label T3, which identifies the location in E-ASBR's forwarding table that tells E-ASBR how to forward packets to destinations matching prefix P. In accordance with the just-described OSPF LSA-Update message from TR1A, moreover, I-ASBR has been directed to send packets to E-ASBR by way of ABR1 and to apply the label, T2, by which ABR1 identifies its forwarding-table location that tells how to forward packets to E-ASBR. But ABR1 is not an immediate neighbor of I-ASBR. By normal route-calculation operations, I-ASBR has identified TR1A as the next hop for packets that must go through ABR1. And TR1A, which is also a label-switching router, has sent I-ASBR a TDP message requesting that it attach a label T1 to packets that it should forward to ABR1.

So I-ASBR's forwarding-table entry for prefix P, i.e., for the best match for destination D, directs that it apply to B-destined packets a label stack whose top label is T1, whose middle label is T2, and whose bottom label is T3.

In accordance with normal label-switching procedures, TR1A receives the thus labeled packet, retrieves the information in its forwarding-table entry specified by the top label T1, replaces it with the replacement label, T4, that its forwarding-table entry contains, and forwards the data packet to a further transit router TR1B. As FIG. 6 indicates, router TR1B removes the top label T4 without replacing it. The reason for this is that a TDP message from ABR1 regarding packets to be forwarded to ABR1 gave the implicit-NULL value for the label. Since TR1B has removed T4, it "exposes" to ABR1 the label, T2, that specifies ABR1's forwarding-table location that tells it how to forward packets to E-ASBR.

In preparing that forwarding-table entry, ABR1 employed the above-described LSA from TR0. ABR1 used that LSA in generating its forwarding-table entry in a manner the same as that employed by I-ASBR to construct its forwarding-table entry. More mechanically, when an ABR receives an AS-External LSA message in which the Link State ID field specifies an ASBR, and the External Route Tag field's first bit and Format fields identify it as an MPLS-label-carrying LSA, then a non-NULL value in the MPLS-label field tells it to place into the forwarding-table entry for the destination represented by link-state ID a two-label replacement-label field. The top label is the label that the ABR has been requested to place in packets being sent to the destination that the LSA's Forwarding Address field specifies. The next label is the one that the LSA's MPLS Label field specifies. In this case, ABR1 uses as the top label a value, T5, that TR0 has asked it, in a TDP message, to use in packets sent to TR0 for forwarding to the router, ABR2, identified in the AS-External LSA's Forwarding Address field. The lower label, T6, is the one that ABR2 placed in the AS-External LSA's External Router Tag field as the label for packets sent through that router to the router, E-ASBR, that the LSA's link state ID identified. So ABR1 replaces T2 with T5 and T6.

Now, none of these operations depends on the manner in which the LSRs have been implemented. As was explained above, the top labels may be contained not only in MPLS headers but additionally, if the label-switching routers are implemented in ATM switches, ATM-cell virtual-channel-indicator fields. For the sake of example, though, we will assume that the Area 1 and Area 2 links are all, say, Ethernet and/or SLIP links, whereas the two links illustrated in Area 0 are ATM links. "Area 0" is the name commonly given to the OSPF area with which all other OSPF areas in a given domain share routers. So the top label, T5, that ABR1 applies is an ATM VCI. Also, since ATM hardware does not lend itself to label-stack "popping," we will assume that ABR2's TDP message to TR0 specified a VCI value, T7, that ABR2 treats as though it were an explicit-NULL label on the top of the label stack. When TR0 swaps top VCI values, it therefore replaces T5 with T7, which ABR2 accordingly discards without using it as an index into its forwarding table. It instead uses T6 for that purpose. As was explained above in discussing the OSPF-message sequence, T6 identifies ABR2's forwarding-table entry for E-ASBR-destined packets.

The replacement-label stack in ABR2's forwarding-table entry for E-ASBR-destined packets does not include a label contributed by the AS-External LSA generated by E-ASBR and forwarded by TR2. Even if ABR2 were to use that AS-External LSA in generating its forwarding-table entry for E-ASBR, the result would not be a label contribution, because, unlike the MPLS Label field in the AS-External LSA that ABR1 received, that field in the AS-External LSA that ABR1 received carried an explicit-NULL value. But ABR2 did not use the received E-ASBR-designating AS-External LSA in computing the entry in its forwarding table for E-ASBR, because E-ASBR would also have sent Area 2 routers, including ABR2, an LSA of the Router (as opposed to AS-External) type in which the Link State ID field also specified E-ASBR. In accordance with normal OSPF forwarding-table computation rules, an LSA of this type is given precedence over an AS-External LSA for computing forwarding-table entries. Since that Router LSA therefore effectively masked the AS-External LSA, receipt of that AS-External LSA did not result in installation of a label in the corresponding forwarding entry for E-ASBR.

In contrast, the E-ASBR-specifying AS-External LSA that ABR1 received was not similarly masked. ABR1 would not have received an E-ASBR-specifying Router-type LSA, because ABR2 would have filtered that such an LSA from E-ASBR as part of its function as an area border router. So ABR1 would instead have received a summary-type LSA specifying a range that included E-ASBR, and normal OSPF rules for route computation would have given precedence to the more-specific AS-External LSA over the less-specific summary LSA.

Since ABR2's forwarding-table entry for E-ASBR therefore has no label contribution from the AS-External LSA, ABR2 replaces label T6 with only a single-label label stack. That stack's label is T8, the label whose use router TR2 requested for E-ASBR-destined packets. When it receives that packet, TR2 uses label T8 to find its forwarding information, which indicates that the replacement label stack should be the empty stack. That is, E-ASBR has sent TR2 a TDP message whose NULL value specified that TR2 should remove but not replace the top labels on packets forwarded in accordance with the forwarding information for E-ASBR. This exposes to E-ASBR the label, T3, associated with E-ASBR's forwarding-table location that tells E-ASBR how to forward packets to the D-containing address range defined by prefix P. E-ASBR accordingly forwards the packet to destination D.

A review of the foregoing operation reveals that it requires much less of the available virtual-circuit-indicator space than conventional schemes do. To appreciate this, consider the link between ABR2 and TR0. Although FIG. 6 depicts only one outgoing from link TR0, there are often very many. Moreover, although we have here discussed only a single exterior destination, the typical backbone can easily be called upon to carry traffic for thousands of them. The resultant number of combinations of links and exterior destinations, in addition to the many interior destinations for which they may need to allocate virtual-circuit identifiers, may well exceed the capacity of the available virtual-circuit-identifier space.

In the forwarding scenario just described, though, TR0 was not required to allocate a virtual-circuit identifier to external destination D (or prefix P) in order to forward D-destined data packets. Indeed, it was not required even to allocate a virtual-circuit indicator to any autonomous-system border router. All that was required of it was that it allocate a virtual-circuit identifier to the area border router involved. This can reduce the number of required virtual-circuit identifier by orders of magnitude.

Moreover, the approach described here is highly compatible with existing routing methods. It builds upon the area partitioning for which many OSPF domains are already configured. It does not require implementation of any new protocol; it employs OSPF, which already is widely used for advertising topological information.

Also, it can be introduced into an OSPF domain gradually. Although not all of its benefits are afforded if not all relevant routers implement it, routers that do can interoperate with those that do not, because the present invention's use of the External Route Tag field will be transparent to routers that have not yet been updated to take advantage of its benefits.

And it can be implemented in ways that differ in detail from the particular embodiment described above. For example, reflection will reveal that the use of the Filter at ABR flag is not mandatory. It is included above only because it may be desirable in some circumstances to specify that filtering should not occur. For example, a system configured differently from the example above may have host routes to the ASBRs installed in all domain routers; e.g., area border routers would not summarize ASBR routes. In such a case, an ASBR could send an AS-External LSA whose Link-state ID field specifies an external destination, whose Forwarding Address field contains an address of that ASBR, and whose External Route Tag field contains the label associated by that ASBR with its forwarding-table entry for that external destination. Routers receiving that LSA would then label packets intended for the external destination with a label stack in which one label is the one that the ASBR thereby requested in the AS-External LSA, and another is a label requested by the next hop in the route to that ASBR. In such a situation, it would be necessary that the ASBR's choice of label and forwarding address be communicated to all routers, not filtered by area border routers, and the don't-filter value in the Filter at ABR field could signify this.

The present invention meets the need for virtual-circuit-indicator conservation in a way that is simple, robust, and easy to implement. It thus constitutes a significant advance in the art.

What is claimed is:

1. A router, comprising:
   a first interface to receive a packet from an external autonomous system;
   a second interface to transmit said packet as an outgoing packet to a border router;
   a processing engine to place a first tag on said outgoing packet in-accordance with a standard tag switching protocol; and
   a shared field in said outgoing packet having at least one bit to indicate a use of said shared field, said at least one bit set by said processing engine to indicate said shared field carries a second tag, said second tag indicating a route from said border router to a destination of said packet.

2. A router as in claim 1 further comprising said first and second tags are forwarding labels.

3. A router as in claim 1 further comprising: said tag switching protocol is Open Shortest Path First (OSPF).

4. A router as in claim 1 further comprising: said second tag indicates transmission of said packet by said border router along a path advertised by an AS-External LSA message.

5. A router as in claim 1 further comprising: said shared field is an External Route Tag field.

6. A router as in claim 1 further comprising: said border router is an Area Border Router (ABR).

7. A router as in claim 1 further comprising: said border router is an Autonomous System Border Router (ASBR).

8. A router as in claim 1, further comprising:
   said second tag indicating an interface for transmission of said packet by said border router after said border router receives said packet.

9. A router, comprising:
   means for receiving a packet from an external autonomous system;
   means for transmitting said packet as an outgoing packet to a border router;
   means for placing a first tag on said outgoing packet in accordance with a standard tag switching protocol; and
   means for setting at least one bit in a shared field in said outgoing packet to indicate said shared field carries a second tag, said second tag indicating a route from said border router to a destination of said packet.

10. A router as in claim 9 further comprising: said first and second tags are forwarding labels.

11. A router as in claim 9 further comprising: said tag switching protocol is Open Shortest Path First (OSPF).

12. A router as in claim 9 further comprising: said second tag indicates transmission of said packet by said border router along a path advertised by an AS-External LSA message.

13. A router as in claim 9 further comprising: said shared field is an External Route Tag field.

14. A router as in claim 9 further comprising: said border router is an Area Border Router (ABR).

15. A router as in claim 9 further comprising: said border router is an Autonomous System Border Router (ASBR).

16. A router as in claim 9, further comprising:
   means for said second tag to indicate an interface for transmission of said packet by said border router after said border router receives said packet.

17. A method for use in a router, said method comprising:
   receiving a packet from an external autonomous system;
   transmitting said packet as an outgoing packet to a border router;
   placing a first tag on said outgoing packet in accordance with a standard tag switching protocol; and
   setting at least one bit in a shared field in said outgoing packet to indicate said shared field carries a second tag, said second tag indicating a route from said border router to a destination of said packet.

18. The method as in claim 17, further comprising:
   using as said standard switching protocol the Open Shortest Path First (OSPF) protocol.

19. The method as in claim 17, further comprising:
   indicating by said second tag transmission of said packet by said border router along a path advertised by an AS-External LSA message transmitted by said border router.

20. The method as in claim 17, further comprising:
   indicating by said second tag an interface for transmission of said packet by said border router after said border router receives said packet.

21. A computer readable media, comprising: said computer readable media containing instructions for execution in a processor for the practice of the method of claim 17.

22. Electromagnetic signals propogating on a computer network, comprising: said electromagnetic signals carrying instructions for execution in a processor for the practice of the method of claim 17.

* * * * *